No. 702,583. Patented June 17, 1902.
A. E. NIGHTINGALE.
CRANBERRY ASSORTING APPARATUS.
(Application filed Aug. 31, 1901.)
(No Model.) 2 Sheets—Sheet 2.
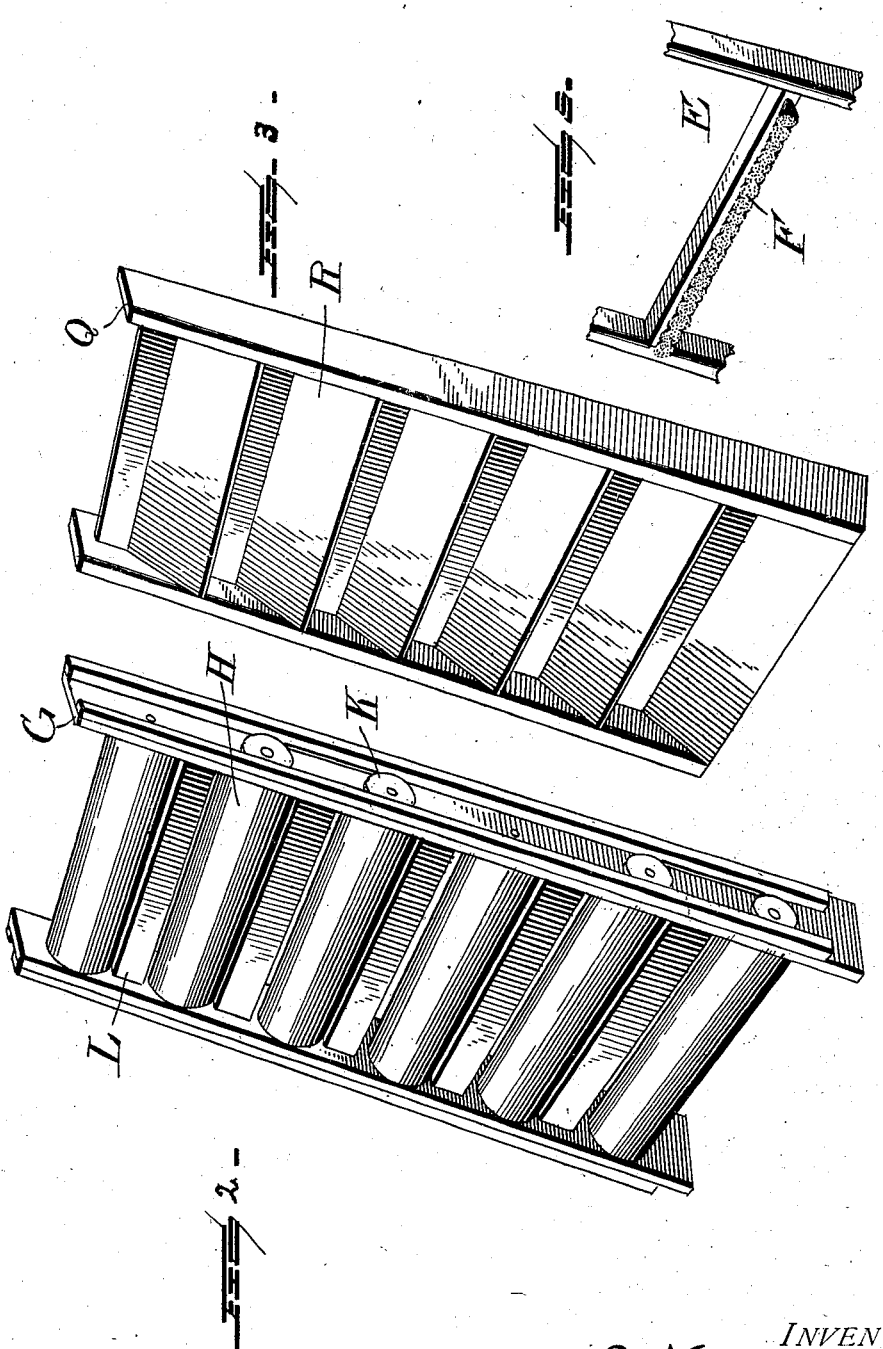
WITNESSES:
INVENTOR
A. E. Nightingale,
BY
Attorney.

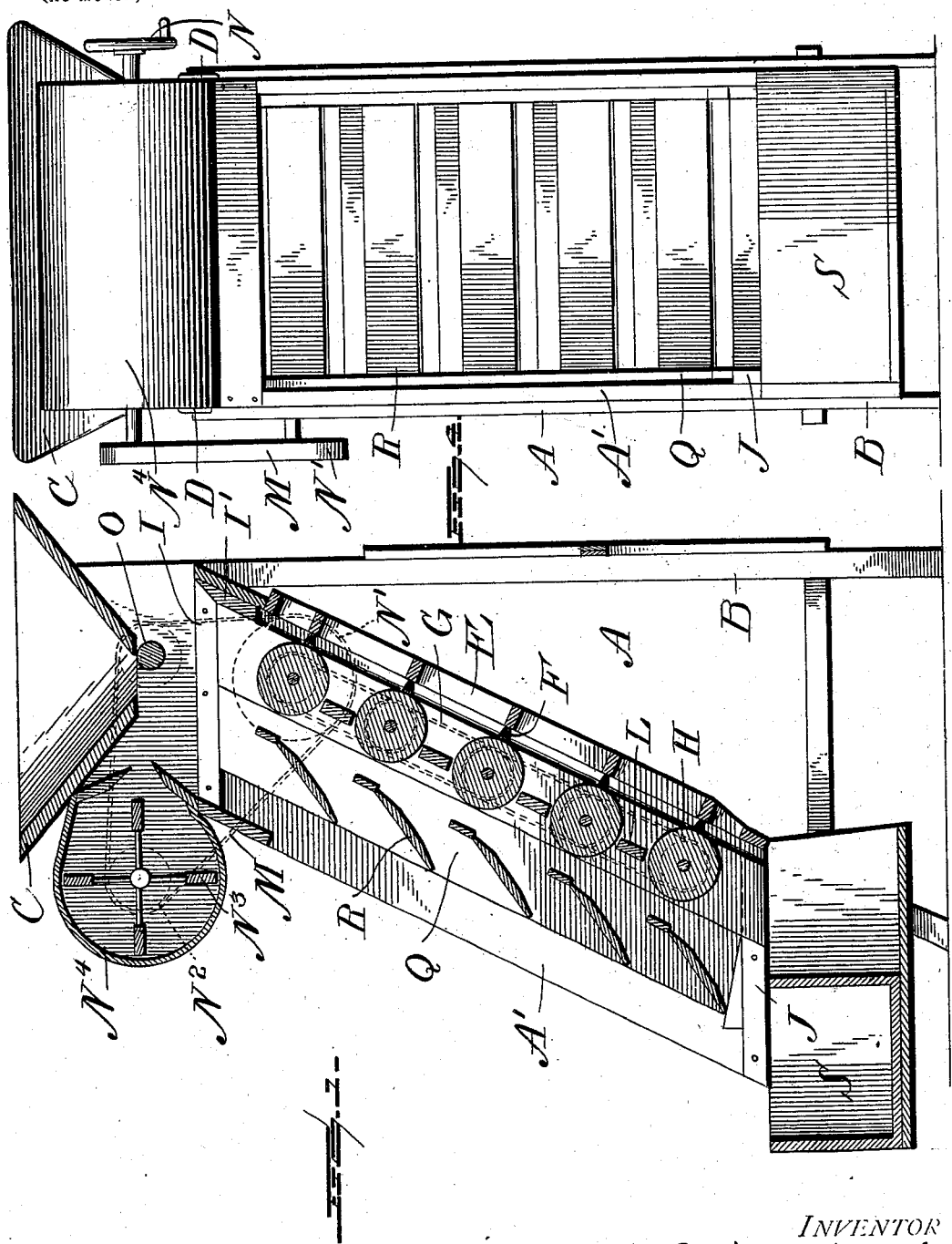

UNITED STATES PATENT OFFICE.

ALVIN E. NIGHTINGALE, OF PLYMOUTH, MASSACHUSETTS.

CRANBERRY-ASSORTING APPARATUS.

SPECIFICATION forming part of Letters Patent No. 702,583, dated June 17, 1902.

Application filed August 31, 1901. Serial No. 73,990. (No model.)

*To all whom it may concern:*

Be it known that I, ALVIN E. NIGHTINGALE, a citizen of the United States, residing at Plymouth, in the county of Plymouth and State of Massachusetts, have invented certain new and useful Improvements in Cranberry-Assorting Apparatus; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in apparatus for sorting cranberries; and it consists in the provision of means whereby the sound berries are separated from the soft or defective ones and conveyed into separate receptacles.

The invention consists, specifically, in the provision of a chute having a rack in which is journaled a series of rollers which are adapted to be rotated by belted connection with one another and onto the upper of which berries are conveyed and allowed to fall by gravity from a hopper, a second rack having a series of steps, which rack is adjustably mounted within the chute and over which the sound berries are adapted to fall after bounding from the upper roller of the chute, brushes being provided for cleaning the rollers as they rotate within the bearings within the chute.

The invention consists, further, of various details and combinations of parts, as will be hereinafter more fully described and then specifically defined in the appended claims.

The invention is clearly illustrated in the accompanying drawings, which, with the letters of reference marked thereon, form a part of this application, and in which drawings—

Figure 1 is a central vertical section through my apparatus. Fig. 2 is a detail view of the set of rollers shown as detached from the frame of the apparatus. Fig. 3 is an enlarged detail view of the rack carrying the step member over which the sound berries fall after being separated from the defective ones. Fig. 4 is a front view of the apparatus, showing the parts adjusted in place.

Fig. 5 is a detail view of the brush attachments for cleaning the rollers.

Reference now being had to the details of the drawings by letter, A designates the frame of the apparatus, which has an inclined chute A', mounted on legs B, and supported upon the upper end of the frame is a hopper C, which is detachably held thereto in a suitable manner, as by means of hooks D. Mounted between the inner walls of the inclined sides A' of the chute is a rack E, which is fastened to the rear longitudinal edges of said inclined side pieces, and at intervals along said rack are horizontally-disposed brushes F, which are adapted to bear against and clean rollers, which will be presently described.

G designates a rack in which is journaled a series of rollers H, the ends of said rollers having pulleys K mounted on the spindle ends thereof, which project through the walls of the rack in which the rollers are journaled. The ends of said rack G are cut diagonally and adapted to rest upon the cleats J, which are horizontally disposed and fastened to the inner walls of the side pieces A', the rear longitudinal edges of the rack G, adapted to rest upon the edges of the rack E, carrying said brushes, while the upper inclined ends of the rack engage against the under faces of the strips I, which are horizontally disposed at the upper end of the side pieces A'. A crosspiece I' is fastened horizontally between the upper ends of the side pieces A', and the upper inclined ends of the side pieces of rack G are adapted to be held in contact with the under edges of piece I when the rack is adjusted in place in the frame. When said rack containing the rollers is adjusted in place, one of said brushes will be positioned adjacent to each roller, adapted to contact with same as the rollers against which the imperfect berries come in contact are caused to be rotated. Between the rollers are the cross-pieces L, which prevent the defective berries from clinging to the rollers as they are rotated.

M designates the belt, which has connection with the pulleys on the ends of the several rollers, and for driving said rollers a crank N is provided, which has belted connection with a pulley N', projecting from the end of one of the spindles of the rollers. Said belt also passes over a pulley N² on a fan-shaft having wings N³, which are mounted in a casing N⁴, communicating with the space directly underneath the hopper, whereby the berries are winnowed as they are fed from the hopper down upon the rollers beneath. Journaled between the walls of the frame adjacent to the outlet end of the hopper is a feed-roller O, which is driven by means of belted connection with the wheel N.

Q designates the longitudinal side pieces of a rack, which has transverse steps R mounted between said strips, the lower ends of the strips being inclined and adapted to rest upon said cleats J, with the inner longitudinal edges of the strips resting against the adjacent edges of the strips of the rack carrying said rollers. These steps are disposed at an angle between the side pieces Q, and in order to adjust the step-carrying rack to properly assort cranberries of different sizes said rack is made adjustable, being adapted to be raised or lowered accordingly as may be desired. A simple means of adjusting this rack may be by means of blocks or wedge-shaped pieces which are inserted underneath the bottom of the longitudinal edges. A drawer or receptacle S is placed at the bottom of the chute underneath the lower end of the step-rack, while a box or receptacle may be placed underneath the lower ends of the rack carrying the rollers for the purpose of receiving the imperfect or defective berries.

In operation the berries are first placed in the hopper and are fed through the outlet by means of the feed-roller, and the draft from the fan will winnow the berries and force the same against the inclined face I' of the transverse strip, and the whole sound berries will bound forward over the upper and outer portion of the step-rack and will fall down over the steps and into the receptacle at the bottom, while the soft or defective berries having no rebound will be carried by the rollers down over the latter and fall by gravity into a receptacle positioned underneath the same for their reception. As the rollers are caused to rotate the brushes being held in contact with the circumference of each roller will thoroughly clean the same.

Having thus described my invention, what I claim to be new, and desire to secure by Letters Patent, is—

1. An apparatus for assorting cranberries, comprising a frame, a removable rack, consisting of two longitudinal strips with diagonally-disposed ends, a series of rollers journaled in said strips, cross-pieces mounted between said rollers, and fastened to said strips, cleats supporting said rack, and a longitudinally-movable step-carrying rack, held in contact with the roller-carrying rack, as set forth.

2. An apparatus for assorting cranberries, comprising in combination with the frame, a removable roller-carrying rack, having its ends diagonally disposed, cleats on which said rack is supported, cross-pieces fastened to said rack, and positioned between the rollers, a longitudinally-movable rack and steps carried thereby, cross-pieces I, against which the upper ends of the racks contact, and a wedge underneath said step-carrying rack, provided to hold the latter against the under edges of said strips I, the adjacent longitudinal edges of said racks, adapted to be held in contact with each other, as shown and described.

In testimony whereof I hereunto affix my signature in presence of two witnesses.

ALVIN E. NIGHTINGALE.

Witnesses:
JOSIAH MORTON,
SIMEON B. NIGHTINGALE.